United States Patent [19]

Tanis

[11] Patent Number: 4,908,002
[45] Date of Patent: Mar. 13, 1990

[54] COMBINE CONVEYOR
[75] Inventor: Dale R. Tanis, Naperville, Ill.
[73] Assignee: J. I. Case Company, Racine, Wis.
[21] Appl. No.: 268,012
[22] Filed: Nov. 7, 1988

Related U.S. Application Data

[63] Continuation-in-part of Ser. No. 101,499, Sep. 28, 1987, Pat. No. 4,787,400.

[51] Int. Cl.[4] ............................................. A01F 7/00
[52] U.S. Cl. ............................ 460/114; 56/14.6; 198/731
[58] Field of Search ............ 56/14.6; 130/27 R, 27 T; 198/731; 460/114

[56] References Cited

U.S. PATENT DOCUMENTS

| | | |
|---|---|---|
| 1,583,665 | 5/1926 | Cox . |
| 2,113,630 | 4/1938 | Sloane . |
| 2,143,092 | 1/1939 | Sloane . |
| 2,282,626 | 5/1942 | Watne . |
| 3,780,851 | 12/1973 | Bichel et al. . |
| 3,939,847 | 2/1976 | Straeter ........................... 130/27 T |
| 3,967,719 | 7/1976 | Kloefkorn et al. . |
| 4,227,538 | 10/1980 | Long et al. ............................. 130/30 |
| 4,498,483 | 2/1985 | Dammann ........................ 130/27 T |
| 4,736,833 | 4/1988 | Tanis ..................................... 198/719 |
| 4,787,400 | 11/1988 | Tanis ............................... 198/731 X |

FOREIGN PATENT DOCUMENTS

0078656  5/1983  European Pat. Off. ............. 198/731

Primary Examiner—George A. Suchfield
Attorney, Agent, or Firm—Peter N. Jansson

[57] ABSTRACT

In a combine conveyor of the type with a conveyor surface, elongated carriers across the surface, and endless chains to move the carriers along the conveyor, resiliently deformable slats are used as carriers and such slats are adjustably secured at their ends to the chains by self-adjusting attachments. The slats are preferably flat, of spring steel, angled with respect to the surface, and in a trailing position. The attachments of the slats to the chains include an attachment link on the chain, and a slot-post arrangement for pivoting/sliding engagement. The slots are preferably in the slats. In one embodiment, an angled mounting surface forms part of the attachment link. In another, angling is achieved by twists in the slat near the slat ends.

20 Claims, 5 Drawing Sheets

COMBINE CONVEYOR

RELATED DOCUMENT

This is a continuation-in-part of U.S. patent application Ser. No. 101,499, filed Sept. 28, 1987, entitled IMPROVED COMBINE CONVEYOR, now U.S. Pat. No. 4,787,400, which will issue on Nov. 29, 1988.

FIELD OF THE INVENTION

This invention is related generally to combine conveyors for moving crop material to threshing apparatus and, more particularly, to the elongated carriers of such conveyors and the means for securing opposite ends of the carriers to drive chains or the like.

BACKGROUND OF THE INVENTION

Combines for harvesting various crops have long included conveyors for moving crop material from cutting or pickup apparatus upwardly and rearwardly along a conveyor surface to an auger or other means for feeding the material into threshing apparatus.

Such conveyors typically include a fixed conveyor surface tilted upwardly toward the threshing apparatus, at least two (often three) endless chains driven by sprockets beside the conveyor surface and having parallel reaches extending along the surface, and a series of elongated carriers secured at their opposite ends to a pair of chains and extending across and above the surface, usually in close proximity to it. Such elongated carriers are driven along the conveyor surface by the chains and serve as means to carry crop material toward the threshing apparatus. The conveyor surface is usually along the lower reaches of the endless chains, and crop material is moved in an undershot manner.

Examples of such prior combine conveyors are disclosed in the following U.S. Pat. Nos. 3,939,847 (Straeter); 4,498,483 (Dammann); 3,967,719 (Kloefkorn et al.); 3,780,851 (Bichel et al.); and 4,227,538 (Long et al.).

Prior combine conveyors of the type described have a number of problems and shortcomings. They are often prone to malfunctions caused by part breakage and deformation. This is caused by the extreme forces and loads applied to them. The parts which break most often include the elongated carriers themselves and the connectors securing them to the chains.

Extreme loads, shocks and forces on such parts are caused by a variety of conditions. Among these are: overloading of crops on the conveyor, particularly when accompanied by an excessive wedging and/or build-up of crops between parts; encountering obstacles such as stones while the conveyor is moving; and variations in chain height (between the two chains supporting an elongated carrier) such as when one of the chains rides over a sprocket tooth. These conditions are not at all uncommon in combine operations.

The extreme forces and shock loads are applied in various directions—sometimes as side loads, sometimes as twisting loads. They can cause permanent deformation of metal parts, including the elongated carriers themselves, immediate breakage of connectors in some cases, stress cracks which eventually lead to breakage in other cases, and all too often catastrophic failures of the equipment when it is needed the most.

Another problem with certain prior combine conveyors is their tendency toward excessive conveyor back feed, that is, the inability of the conveyor to more completely release the crop material to the auger above, particularly when there is a heavy flow of such material. In such cases, some crop material is carried back down the conveyor along the upper reach of the chains, the crop material being held against the back portions of the elongated carriers.

In response to the considerable problems related to stress and breakage, there has been a tendency to build sturdier and stouter elongated carriers and chain-mounting devices. This is typically done by adding material thickness and/or by configuring the elongated carriers to add structural strength. These efforts in some cases may tend to forestall problems, while in other cases they may result in more difficult clogs and jams and forces with all the attendant stress and failure of material.

There has long been a clear need for an improved combine conveyor. A response is described in the document mentioned above, now issued as a patent. Such document discloses an improved conveyor with resiliently deformable slats as carriers, and securing means between each slat end and chain which allows pivoting about two axes to accommodate changes in the positions and orientations of the slats during conveyor use.

The securing means of the specific embodiments disclosed in such document have a number of pieces, including what are referred to as an attachment link attached to the chain, a slat connector piece pivotably attached to the attachment link, and means attaching the slat to the slat connector piece. A variety of preferred features are described. The invention described in this continuation-in-part is a further variation and improvement of the invention described in such related document.

OBJECTS OF THE INVENTION

It is an object of this invention to provide an improved combine conveyor overcoming problems and shortcomings of the prior art, including those mentioned above.

Another object of this invention is to provide a combine conveyor which can better withstand the many and varied stresses and forces applied to it during operation.

Another object of this invention is to provide a combine conveyor less susceptible to catastrophic failure during use.

Another object of this invention is to provide a combine conveyor with improved shock-absorbing characteristics.

Another object of this invention is to provide a combine conveyor better able to withstand malfunctions of the drive chains and sprockets which impose additional stresses on parts.

Another object of this invention is to provide a combine conveyor which reduces back feed of crop material and reduces build-up of crop material on the back of the elongated carriers.

Another object of this invention is to provide a combine conveyor which will operate problem-free for extended periods.

Another object of this invention is to provide an improved combine conveyor with all of the aforementioned advantages which is simple in construction, yet well able to withstand substantial loads, forces and obstacles without damage to the conveyor.

These and other important objects will be apparent from the descriptions of this invention which follow.

SUMMARY OF THE INVENTION

This invention is an improved combine conveyor of the type used for elevating cut crop material to the threshing apparatus of axial-flow combines.

The improved conveyor of this invention is of the type typically used to take fresh-cut crop material which is fed to it at a lower end of the conveyor and deliver such crop material in an undershot manner along a slanted surface to a rotating auger or other up-take means at an upper end of the conveyor. The improved combine conveyor of this invention overcomes the aforementioned problems and shortcomings of devices of the prior art.

As in other combine conveyor apparatus of this general type, the invention includes a conveyor surface, at least two carrier chains having parallel reaches along the surface, elongated carriers extending across the surface in spaced fashion, and means securing opposite ends of the elongated carriers with respect to the chains. The chains are driven by sprockets and are endless loops which form the parallel reaches along the conveyor surface.

The improved conveyor of this invention has resiliently deformable slats as the carriers, and the means securing opposite ends of the slats includes means allowing a degree of adjustment in both the position and the orientation of the ends. These characteristics allow the carriers in this sort of combine conveyor to respond to loads, forces and obstacles of various kinds without damaging the conveyor.

In highly preferred embodiments, the slats are flat and are made of spring steel to have excellent resilience. The term "resiliently deformable" means that the slats are capable of being bent and twisted in various directions, in response to loads, forces and obstacles of the type discussed above, and then recovering their original configurations or shapes. That is, such deformations, rather than being permanent, are transitory, lasting only as long as the load, force or obstacle remains in effect or in place.

In highly preferred embodiments, the slats are angled with respect to the surface, each having a lead edge away from the surface and a trailing edge adjacent to the surface. With this orientation of slats, material carried by the conveyor tends to be drawn against the surface.

At least one end of each slat (in preferred embodiments both ends of the slat) is secured to the chain by securing means which includes an attachment link attached to the chain and a pivot post-in-slot arrangement which allows self-adjusting relative movement of the slat and attachment link. Either the slat end has a slot to receive a pivot post which is on the attachment link, or the attachment link has a slot to receive a pivot post which is on the slat end. The former, with the slat end having the slot, is highly preferred.

The term "slot" as used herein refers to a hole which is elongated such that a post can extend through it in any position along the length of the hole. The use of such pivot post-in-slot connection facilitates self-adjustment of the position and orientation of the slat ends such that the slats can respond to loads, forces and obstacles without damage to the conveyor. The slot is preferably parallel to the length of the slat.

The attachment link preferably has a main portion which is attached to two chain pins, including a forward pin and a rearward pin, and most preferably itself forms a portion of the chain. The attachment link, in addition to its main portion, also has at least one mounting portion extending laterally from the main portion toward the slat. Various preferred mounting portions will be described below.

The slat preferably is secured with respect to the mounting portion at a position closer to the rearward chain pin than the forward chain pin, and this reduces accumulation of crop material on the back side of the slats at the time slats begin their return movement along the endless chains which drive them after bringing crop material up to the auger or other take-up apparatus. Thus, crop back feed problems are reduced.

In one preferred embodiment spaced upper and lower mounting portions extend laterally toward the slat from along the parallel upper and lower edges of the attachment link main portion, and a slat end is received between such upper and lower mounting portions. The pivot post extends between the upper and lower mounting portions and through the slot in the slat end. Load-absorbing means are between the slat end and each of the upper and lower mounting portions. This allows absorption of load received by the slat, while the post-and-slot arrangement allows both pivoting of the slat end with respect to the attachment link, and sliding adjustment of the slat with respect to the attachment link in a direction along the slat.

In such embodiments, the load-absorbing means preferably are elastomeric members. Rubber rings or the like are acceptable provided they are of sufficient dimension and elastic quality to accommodate loads.

The aforementioned preferred angling of each slat may be accomplished even when the upper and lower mounting portions of the attachment link are generally parallel to the conveyor surface and the pivot post extending between such upper and lower mounting portions is perpendicular to the conveyor surface. In certain preferred embodiments, the angling in such situations is accomplished by shaping the slat with twists. More specifically, near each end of each slat, a twist is placed in the slat between the slat center portion, which is to be angled, and the slat end such that the end is substantially parallel to the conveyor surface while the center portion is angled. The extent of the angling is determined by the extent of the twists at either end of the slat.

In another preferred embodiment of this invention, the attachment link has a single mounting portion which extends laterally from the main portion toward the slat, and such mounting portion has a mounting surface from which the pivot post extends. The slat end is in surface contact with the mounting surface, with the pivot post extending through the slot.

In highly preferred embodiments of this general type, the mounting surface is angled with respect to the direction of conveyor movement, and such angling allows the slats to be supported in the preferred angled orientation. That is, the slats are angled with respect to the conveyor surface, each slat having a lead edge away from the surface and a trailing edge adjacent to the surface.

The mounting surface of such single mounting portion of the attachment link preferably has a convex curvature in contact with the slat end. Such convex curvature facilitates deformation of the slat, allowing the slat end to wrap against the mounting surface more readily when it is deformed in certain ways.

This invention provides, in a simple and inexpensive construction, a great deal of flexibility to deal with loads of various kinds, whether intended and unintended loads. The resiliently deformable slats accommodate significant forces of various kinds exerted in various directions. And, the securing means further enhance such ability to accommodate various loads and forces, allowing rotation around the axis of the pivot post, extension by relative movement of the pivot post in the slot, and in certain cases absorption of certain loads on elastomeric members or other shock absorbers.

In the improved combine conveyor of this invention, the slats will maintain their straightness despite repeated shock loads, forces, obstacles and the like. This increases the useful life of the slats and the entire conveyor apparatus. Stress cracks and other damage to parts are much less likely to develop.

The apparatus of this invention can accommodate, without undue material stress, events which place twisting loads or side loads on the slats, whether they involve momentary chain height variations such as occur when one of the chains improperly engages a sprocket tooth, momentary imposition of force by a rock or other obstacle, or any of several other events occurring in combine operations. In the past these events frequently led to carrier damage, material fatigue, and sometimes catastrophic failures. With this invention such events lead only to temporary resilient slat deformation together with pivoting action and other self-adjusting relative movements at the slat ends with respect to the chain. So damage to parts is avoided.

DETAILED DESCRIPTIONS OF PREFERRED EMBODIMENTS

Figure 1:
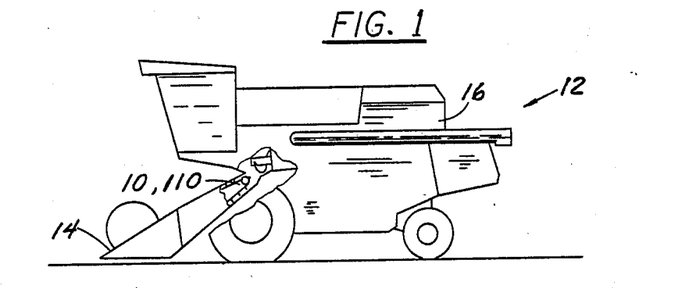
FIG. 1 is a side elevation of an axial flow combine having an improved combine conveyor in accordance with this invention.

The drawings illustrate two preferred embodiments of the combine conveyor of this invention. These include combine conveyor 10, illustrated in FIGS. 1-9, and combine conveyor 110, illustrated in FIGS. 1 and 10-12. In each case the conveyors, as shown in FIG. 1, are part of a combine 12. Conveyors 10 and 110 are each located between a crop pick-up apparatus 14 and the threshing apparatus 16 of combine 12. Like parts in such two embodiments will be identified by like numerals.

Figure 2:
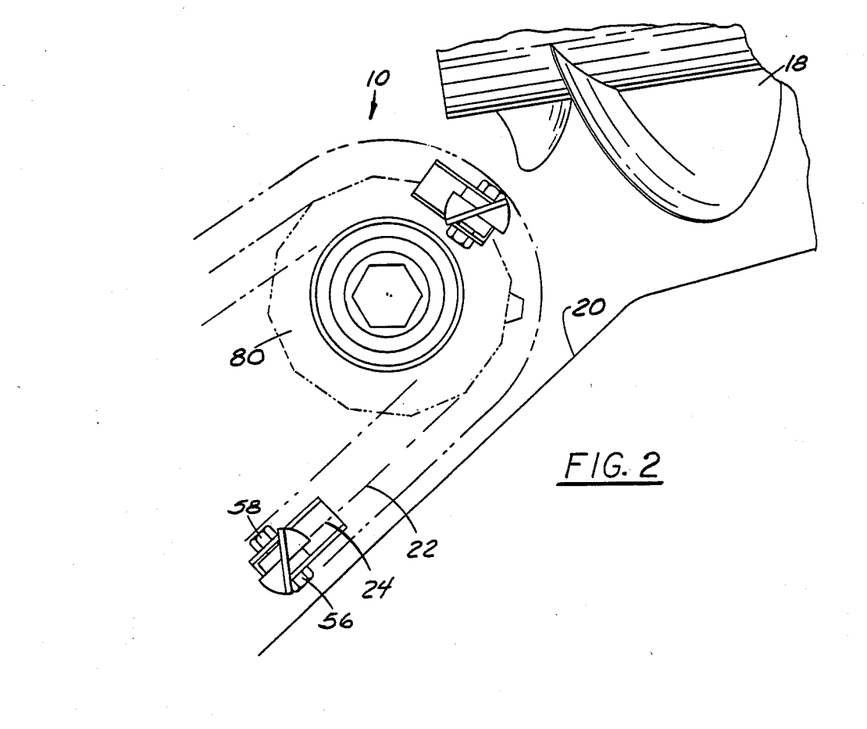
FIG. 2 is an enlarged fragmentary side elevation of a portion of the combine conveyor of FIG. 1 and an adjacent auger which receives crop material from the conveyor.
Figure 3:
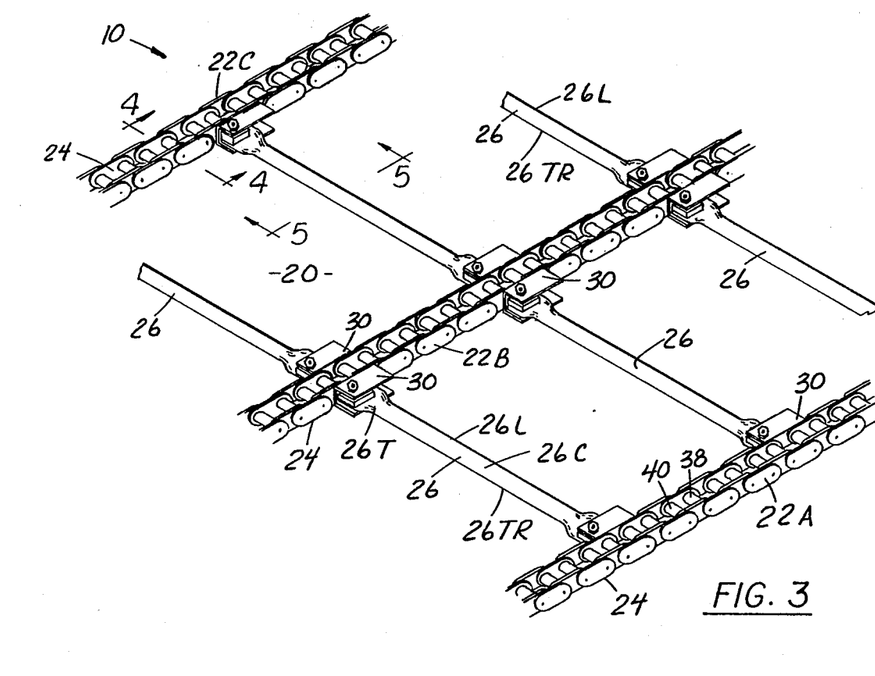
FIG. 3 is a fragmentary perspective view of the lower reach of the conveyor.
Figure 4:
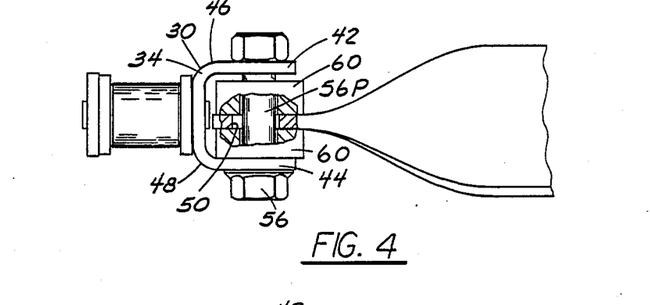
FIG. 4 is an enlarged sectional view taken section 4—4 as indicated in FIG. 3.

As illustrated in FIGS. 1 and 2, combine conveyor 10 moves crop material from pick-up apparatus 14 to an auger 18 which takes the crop material into threshing apparatus 16. Combine conveyor 10 has a conveyor surface 20 which is flat and substantially planar, and is oriented at an upward slant toward auger 18 and threshing apparatus 16. Conveyor 10 also has a plurality of chains 22, including chains 22A, 22B and 22C as shown in FIG. 3, which have parallel lower reaches 24 extending along and just above conveyor 20.

Figure 10:
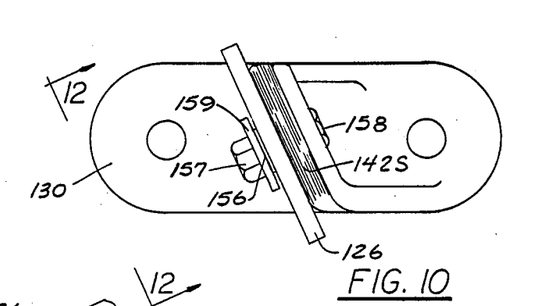
FIG. 10 is an enlarged sectional view of part of another embodiment, taken along the slat as in FIG. 5.
Figure 11:
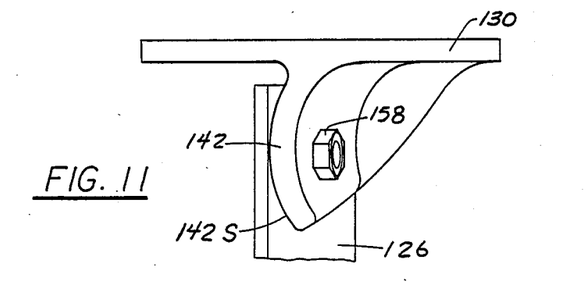
FIG. 11 is a plan view of FIG. 10.
Figure 12:
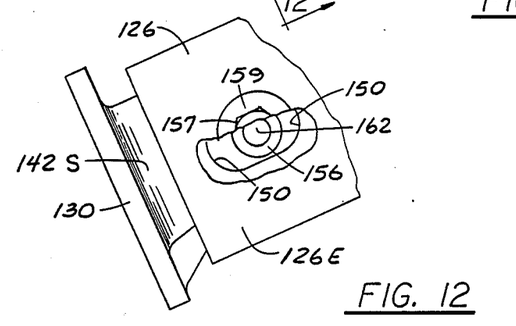
FIG. 12 is an auxiliary view taken along section 12—12 as indicated in FIG. 10, with partial breakaway.

Combine conveyor 110 operates in much the same manner as conveyor 10, with some of the same parts and same surrounding structures. The differences between conveyors 10 and 110 will become apparent as the description proceeds. It will be seen that there is no need to repeat an entire description; therefore, only the parts which differ will be described.

Referring again to conveyor 10, shown in FIGS. 1-9, a number of slats 26, the characteristics of which form a part of this invention, extend across and just above conveyor surface 20. Slats 26 have opposite ends 26E which are secured with respect to chains 22 by securing means hereafter described, such securing means also forming a part of this invention. Slats 26 and their securing means give a shock-absorbing ability to the combine conveyor which serve to overcome many of the problems and shortcomings of prior combine conveyors.

Slats 26 are spaced equally around the endless loops of chains 22. Slats 22 are each perpendicular to the direction of conveyor movement, which, of course, is the direction of chain lower reaches 24.

Figure 8:
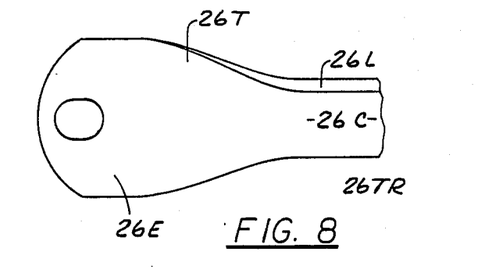
FIG. 8 is a plan view of the slat end of FIGS. 2-7.
Figure 9:
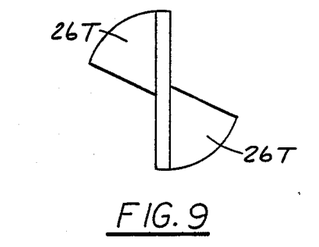
FIG. 9 is a left side elevation of FIG. 8.

Slats 26 are substantially flat (that is, planar) resiliently deformable pieces, with permanent twists near each end as hereafter described. More specifically, each slat 26 has opposite ends 26E and a flat center portion 26C which extends across conveyor surface 20. In each slat 26, there is a twist 26T between center portion 26C and each end 26E. Center portion 26C is angled with respect to conveyor surface 20, with a lead edge 26L away from surface 20 and a trailing edge 26TR adjacent to surface 20. This configuration causes material carried by slats 26 to tend to be drawn against conveyor surface 20. Twists 26T are such that ends 26E are substantially parallel to conveyor surface 20 while center portion 26C is angled.

"Resiliently deformable" means that the slats are capable of being bent, twisted or otherwise deformed as described above by the shocks and forces applied during operation without permanent deformation. Thus, when the shocks and forces are no longer applied, the slats immediately return to their original flat configuration without having sustained damage.

Such resiliently deformable characteristic is achieved in part by a proper choice of materials and dimensions for slats 26. While preferred dimensions and materials will vary greatly depending upon a number of factors, such as the overall size of the combine, the intended use and the extent of the expected load, some useful guidelines and specific examples of preferred materials and dimensions can be given.

For combines of substantial size, such as those used in harvesting corn, spring steel is a highly preferred material for slats 26. Spring steel is steel treated to have the ability to recover to its original flat configuration after substantial deformation. One preferred spring steel is a 1060–1080 steel with a hardness on a Rockwell C scale of C40–45, tempered to 500° F. minimum.

Slats of such preferred spring steel, intended for use in a combine generally of the size described, preferably have a material thickness of about 4–5 mm. Slats 26 are rectangular in shape before they are permanently twisted with twists 26T. The preferred width for such slats is about 30–50 mm, while a preferred length is about 300–600 mm. Acceptable dimensions can vary greatly. Preferred dimensions are somewhat dependent on the exact material used. One dimension is often somewhat dependent on other dimensions.

While spring steel is a highly preferred material for slats 26, other materials may be used provided they have the required resiliently-deformable characteristics. Other suitable materials include various other metals and metal alloys and various plastics chosen or formulated to provide the desire characteristics.

The resilient deformation of slats 26 is facilitated and accommodated by the means used to secure slats 26 to chains 22. Such securing means allow adjustment of the position and orientation of slat opposite ends 26E as slat 26 is deformed during operation.

Figure 7:
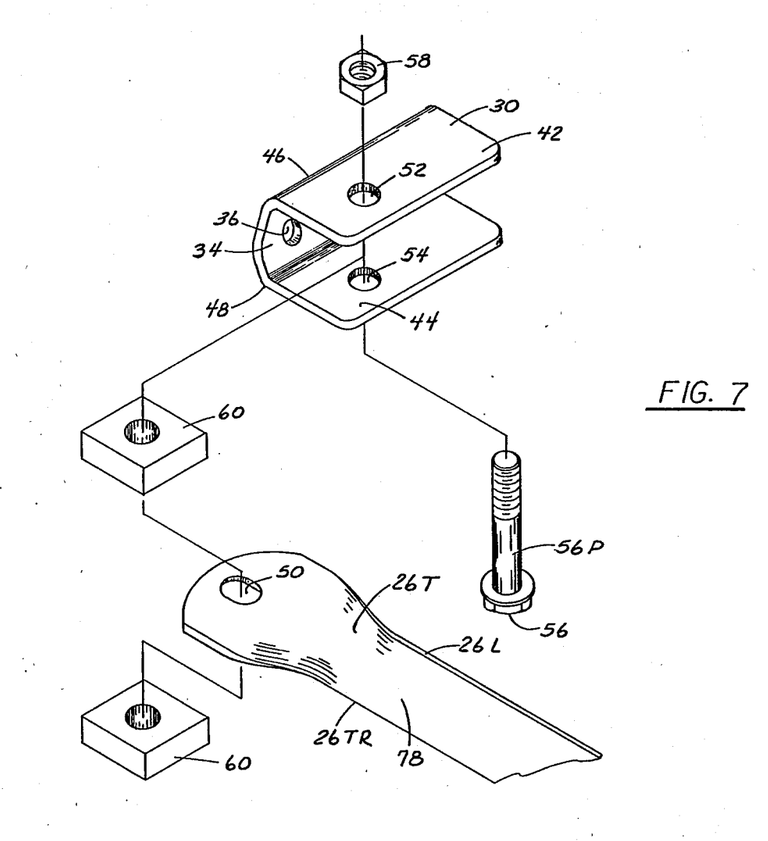
FIG. 7 is an exploded view of the end of a slat and the apparatus for securing such slat to a chain.

Such securing means, for each slat end 26E, includes an attachment link 30 which has a main portion 34 having two holes 36 sized and positioned to allow attachment link 30 to be snapped onto two consecutive chain pins, forward and rearward pins 38 and 40. Thus, main portion 34 of attachment link 30 itself forms a portion of the chain in the normal manner of a chain link.

Attachment link 30 also has spaced upper and lower mounting portions 42 and 44 which extend laterally from upper and lower edges 46 and 48, respectively, of main portion 34. Slat end 26E is received between upper and lower mounting portions 42 and 44, and pivotably secured thereto by means of a bolt 56. Bolt 56 provides a pivot post 56P which extends through a slot 50 formed in slat end 26E. Holes 52 and 54 extend through upper and lower mounting portions 42 and 44, respectively, of attachment link 30. Bolt 56, which provides a pivot point, extends through hole 52 of upper mounting portion, slot 50 of slat end 26E, and hole 54 of lower mounting portion, and is secured by a nut 58.

Slot 56 is elongated in a direction parallel to slat 26, and the dimensions of slot 50 and pivot post 56P are such that the two are relatively movable. Such connection allows slat 26 both to pivot and to extend with respect to attachment link 30 and chain 22.

Figure 5:
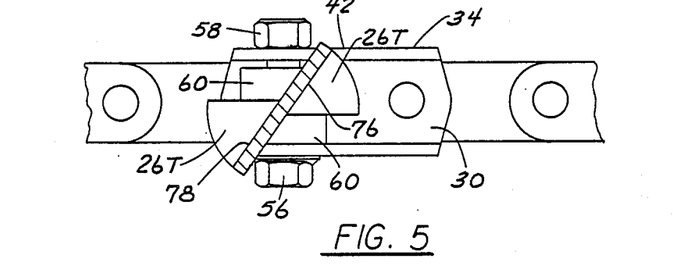
FIG. 5 is a sectional view taken along section 5—5 as indicated in FIG. 3.
Figure 6:
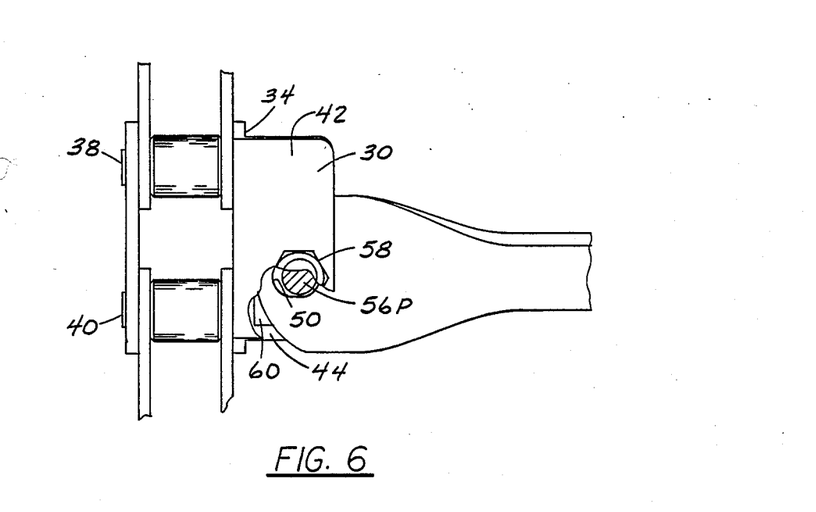
FIG. 6 is a plan view of FIG. 5, with partial breakaway.

Rubber shock-absorber rings 60 are placed above and below slat end 26E, one between slat end 26E and upper mounting portion 42 of attachment link 30 and the other between slat end 26E and lower mounting portion 44. Such rings absorb some of the loads applied on slats 26, particularly lifting and twisting loads.

Slats 26 can be twisted, bowed and/or lifted at one end without undue strain or damage. Whatever sort of deformation occurs, even during the most strenuous application of shock loads and forces, the securing means described above can accommodate the resulting deformations.

As illustrated in the figures, slats 26 are angled with respect to conveyor surface 20. Slats 26 have front and back surfaces 76 and 78, respectively. It is preferred that the angle of slat 26, that is, the angle of front surface 76 with respect to conveyor surface 20, be in excess of 60 degrees, most preferably on the order of 70 degrees. Such angling is best for drawing crop material against conveyor surface 20.

The configuration of attachment link 30, that is, the positions of its mounting portions 42 and 44, is preferably such that its slat 26 is secured to attachment link 30 at a position which is closer to rearward pin 40 of chain 22 than it is to forward pin 38. Thus, slats 26 are in trailing positions with respect to the mid-lengths of main portions 34 of their attachment links 30, and are generally aligned with the rearward ends of main portions 34.

Such location of slats 26 during their motion around the upper sprocket 80, which is shown in FIGS. 1 and 2, tends to reduce crop accumulation on back surfaces 78 of slats 26. This tends to reduce the resultant back feed of crop material during the return movement of slats 26, along the upper reaches of chains 22. The aforementioned angling of slats 26 is also helpful in reducing such back feed.

As shown in FIG. 3, middle chain 22B has mirror-image attachment links 30 on either side. However, such mirror-image attachment links function entirely independently of each other.

The combine conveyor of FIGS. 1 and 10–12, as earlier noted, is similar to combine 10 in many respects. However, there are significant differences. In particular, conveyor 110 has slats 126 which are free of twists and attachment links 130 each with just one mounting portion 142 extending laterally from a main portion 34.

Each mounting portion 142 has a mounting surface 142S against which slat end 126E is supported. Mounting surface 142S is angled with respect to the direction of conveyor movement. Such angling allows slat 126 to be angled with respect to conveyor surface 20 without any twist or other provision for angling.

Projecting from the main surface of mounting surface 142S, and preferably integrally formed as part of mounting surface 142S, is a short pivot post 156. Pivot post 156 has an outer dimension small enough such that it may extend through slot 150 in slat 126. By virtue of slot 150 slat 126 is free to move in a direction along the length of slat 126, in the same manner as in the embodiment of FIGS. 2–9.

A securement hole 162 extends through mounting portion 142 in a position centered on pivot post 156. A bolt 157 and lock nut 158, along with a washer 159, are used to secure slat 126 to mounting surface 142S and pivot post 156 of mounting portion 142.

As shown best in FIG. 11, mounting surface 142S has a convex curvature in contact with slat end 126E. Such curvature facilitates movement of slat 126 around mounting surface 142S during deformation of slat 126, and avoids undue wear on slats 126 which might otherwise be caused by edge contact.

The combine conveyor of this invention may be made using common and widely available materials and a number of available parts. Specialized parts, of course, must be fabricated, and this may be done in a variety of methods well known to those skilled in the art.

While the principles of this invention have been described in connection with specific embodiments, it should be understood clearly that these descriptions are made only by way of example and are not intended to limit the scope of the invention.

I claim:

1. In a combine conveyor of the type having a conveyor surface, at least two chains having parallel reaches along the surface, elongated carriers extending across the surface and means securing opposite ends thereof with respect to the chains, the improvement comprising:

resiliently deformable slats as the carriers; and at least one of the securing means of the chain and the respective slat end including an attachment link attached to the chain, the slat end and attachment link having an elongated slot and a pivot post through the slot and relatively movable therein to accommodate multi-dimensional movement of slat ends with respect to the attachment link, said pivot post being the sole pivot point in said securing means, thereby allowing self-adjustment of the position and orientation of the slat ends such that the slats can respond to loads, forces and obstacles without damage to the conveyor.

2. The combine conveyor of claim 1 wherein the elongated slot is through the slat end and the pivot post is on the attachment link.

3. The combine conveyor of claim 2 wherein the slot is parallel to the length of the slat.

4. The combine conveyor of claim 3 wherein the slats are substantially flat.

5. The combine conveyor of claim 4 wherein the slats are of spring steel.

6. The combine conveyor of claim 4 wherein the slats are angled with respect to the surface, each having a lead edge away from the surface and a trailing edge adjacent to the surface, whereby material carried by the slats tends to be drawn against the surface.

7. The combine conveyor of claim 3 wherein:

the attachment link has a main portion connected to two chain pins, including a forward pin and a rearward pin, and at least one mounting portion extending laterally from the main portion toward the slat; and the slat is secured with respect to the mounting portion at a position closer to the rearward pin than the forward pin, whereby accumulation of crop material on the back side of the slats and crop back feed ar reduced.

8. The combine conveyor of claim 7 wherein the attachment link main portion forms a portion of the chain.

9. The combine conveyor of claim 8 wherein the slats are substantially flat.

10. The combine conveyor of claim 9 wherein the slats are of spring steel.

11. The combine conveyor of claim 9 wherein the slats are angled with respect to the surface, each having a lead edge away from the surface and a trailing edge adjacent to the surface, whereby material carried by the slats tends to be drawn against the surface.

12. The combine conveyor of claim 3 comprising:

the attachment link having a main portion connected to two chain pins, including a forward pin and a rearward pin, and spaced upper and lower mounting portions extending laterally toward the slat from along the attachment link main portion and receiving the slat end therebetween, the pivot post extending between the upper and lower mounting portions through the slot in the slat end; and means between the slat end and each of the upper and lower mounting portions to absorb load received by the slat.

13. The combine conveyor of claim 12 wherein the absorbing means are elastomeric members.

14. The combine conveyor of claim 3 wherein the attachment link comprises:

a main portion connected to two chain pins; and a mounting portion extending laterally from the main portion toward the slat, the mounting portion having a mounting surface with the pivot post on the mounting surface, the slat end being in surface contact with the mounting surface with the pivot post extending through the slot.

15. The combine conveyor of claim 14 wherein the slats are angled with respect to the surface, each having a lead edge away from the surface and a trailing edge adjacent to the surface, whereby material carried by the slats tends to be drawn against the surface.

16. The combine conveyor of claim 15 wherein the mounting surface is angled with respect to the direction of conveyor movement to support the slats in the angled orientation.

17. In a combine conveyor of the type having a conveyor surface, at least two chains having parallel reaches along the conveyor surface, elongated carriers extending across the conveyor surface and means securing opposite ends thereof with respect to the chains, the improvement comprising:

resiliently deformable slats as the carriers, each such slat having:

a flat center portion angled with respect to the conveyor surface with a lead edge away from the such surface and a trailing edge adjacent to such surface whereby material carried by the slats tends to be drawn against the conveyor surface; and a twist between the center portion and each of the ends such that the ends are substantially parallel to the conveyor surface while the center portion is angled;

the securing means for at least one end of each of said slats each including:

an elongated slot through the respective slat end and substantially parallel to the length of the slat;

an attachment link attached to the chain with a pivot post thereon, said attachment link having:

a main portion connected to two chain pins, including a forward pin and a rearward pin; and spaced upper and lower mounting portions extending laterally toward the slat from along the attachment link main portion and receiving the slat end therebetween, the pivot post extending between the upper and lower mounting portions through the slot and relatively movable in said slot; and means between the slat end and each of the upper and lower mounting portions to absorb load received by the slat.

18. In a combine conveyor of the type having a conveyor surface, at least two chains having parallel reaches along the conveyor surface, elongated carriers extending across the conveyor surface and means securing opposite ends thereof with respect to the chains, the improvement comprising:

resiliently deformable slats as the carriers, each such slat angled with respect to the conveyor surface and having a lead edge away from such surface and a trailing edge adjacent to such surface whereby material carried by the slats tends to be drawn against the conveyor surface; and the securing means for at least one end of each of said slats each including:

an elongated slot through the respective slat end and substantially parallel to the length of the slat;

an attachment link attached to the chain with a pivot post thereon, said attachment link having:

a main portion connected to two chain pins; and a mounting portion extending laterally from the main portion toward the slat, the mounting portion having a mounting surface with the post extending therefrom, the slat end being in surface contact with the mounting surface with the post extending through the slot, said mounting surface angled with respect to the direction of conveyor movement to support the slats in the angled orientation and having a convex curvature in contact with the slat end to facilitate deformation of the slat.

19. The combine conveyor of claim 18 wherein the slats are substantially flat.

20. The combine conveyor of claim 19 wherein the slats are of spring steel.

* * * * *

UNITED STATES PATENT AND TRADEMARK OFFICE
CERTIFICATE OF CORRECTION

PATENT NO. : 4,908,002

DATED : March 13, 1990

INVENTOR(S) : Dale R. Tanis

It is certified that error appears in the above-identified patent and that said Letters Patent is hereby corrected as shown below:

Col. 9, claim 7, line 42, change "ar" to --are--.

Col. 10, claim 17, line 45, a new subparagraph should be created starting with the word "spaced".

Col. 7, line 65, the numeral "60" should not be printed in bold type.

Signed and Sealed this

Twenty-sixth Day of March, 1991

Attest:

HARRY F. MANBECK, JR.

*Attesting Officer*     Commissioner of Patents and Trademarks